United States Patent [19]

Balka

[11] Patent Number: 4,957,228
[45] Date of Patent: Sep. 18, 1990

[54] CARGO CARRIER FOR VANS

[76] Inventor: Daniel R. Balka, 908 Clearview Ave., Jasper, Ind. 47546

[21] Appl. No.: 333,331

[22] Filed: Apr. 5, 1989

[51] Int. Cl.$^5$ ............................ B60R 9/14; B60R 9/06
[52] U.S. Cl. ........................ 224/42.03 A; 224/42.07;
224/42.08; 224/42.06; 224/282; 224/42.42;
224/42.45 R; 296/37.1; 280/769
[58] Field of Search ............................ 296/37.1, 37.6;
280/769; 224/42.06

[56] References Cited

U.S. PATENT DOCUMENTS

| | | |
|---|---|---|
| 2,440,821 | 5/1948 | Godwin . |
| 2,600,082 | 6/1952 | Summer . |
| 3,228,576 | 1/1966 | Gaukel .................. 224/42.03 A |
| 3,393,845 | 7/1968 | Gilbreath ..................... 224/318 |
| 3,476,162 | 11/1969 | McMiller ................. 224/318 X |
| 3,999,693 | 12/1976 | Cooper . |
| 4,039,106 | 8/1977 | Graber . |
| 4,221,311 | 9/1980 | Penn ........................... 224/42.08 |
| 4,241,858 | 12/1980 | Lawroski ................ 224/42.03 A |
| 4,320,862 | 3/1982 | Bettenhausen ........... 224/42.03 A |
| 4,345,705 | 8/1982 | Graber ................... 224/42.03 R |
| 4,411,461 | 10/1983 | Rosenberg ............ 224/42.03 A X |
| 4,671,439 | 6/1987 | Groeneweg ............ 224/42.03 A |
| 4,756,457 | 7/1988 | Polk ...................... 224/42.03 A |
| 4,785,980 | 11/1988 | Redick ................... 224/42.03 A |
| 4,844,528 | 7/1989 | Johnson ...................... 296/37.1 |

FOREIGN PATENT DOCUMENTS

| | | | |
|---|---|---|---|
| 159716 | 7/1957 | Sweden .................... 224/42.03 R |
| 2009687 | 6/1979 | United Kingdom ............ 224/42.06 |

Primary Examiner—Ernest G. Cusick
Attorney, Agent, or Firm—Woodard, Emhardt, Naughton Moriarty & McNett

[57] ABSTRACT

A removable cargo carrier for van-type vehicles, in which the vehicle includes a body, a rear bumper, a rear door assembly and a groove between the perimeter of the door assembly and the van body, includes a cargo box having a number of walls defining an enclosure with a door for providing access to the enclosure. The cargo box is attached to a mounting frame which includes a pair of spaced apart elongated vertical members having rubber caps at the bottom of the members for abutting engagement with the bumper of the van. A lateral flexible strap is connected between the vertical members and the cargo box with a bracket attached at each of its free ends for connection to the door assembly at portions of the groove between the vehicle body and the door assembly at the opposite sides of the door assembly. A pair of suction cups are attached at generally mid-length along the length of the vertical members to establish a fulcrum point for reacting the weight of the cargo box and its contents against the vehicle door assembly. A secod pair of brackets are adjustably connected to the lower portions of the vertical members, each of the brackets being configured to engage the door assembly at portions of the groove at the bottom of the door assembly.

11 Claims, 7 Drawing Sheets

CARGO CARRIER FOR VANS

BACKGROUND OF THE INVENTION

The present invention concerns cargo carriers or baggage containers for motor vehicles. Particularly, the invention concerns cargo carriers for removable attachment to van-type vehicles.

Van-type vehicles have an enclosed body usually with two rear doors which are hinged at the outside edges of the doors and which swing toward the center of the van body. The typical van also includes a separate sliding side door which is most frequently utilized for access to the interior of the van body. The rear swing doors are usually reserved for loading cargo or luggage into the van.

In recent years, the full-sized vans have given way to the small "mini-vans", which gained almost instant popularity during the oil crisis of the 1970's. The mini-van has made family travel and recreational outings more economical than the full-sized van, and has provided a vehicle that is as easy to maneuver as an automobile, yet is designed for more comfortable travel. One difficulty with the mini-vans is that they often do not have as much storage space as a full-sized van and are, therefore, not as convenient for long duration trips.

With mini-vans, as with the smaller sedan-type vehicles, auxiliary storage space is frequently necessary. The typical approach for providing auxiliary storage space has been the car-top carrier which is mounted onto the roof of the vehicle. While the car-top carrier may be adequate for sedan-type vehicles, the same carrier presents several problems when used on a mini-van or even a full-sized van. Since the mini-van is taller than a typical sedan, the extra height becomes an inconvenience in mounting the car-top carrier onto the van roof and in loading the carrier. Moreover, the car-top carrier increases the wind resistance of the mini-van, which leads to a reduction in fuel economy.

SUMMARY OF THE INVENTION

It is, therefore, an object of the present invention to provide a cargo carrier for use on van and mini-van-type vehicles that is easy to attach or mount to the vehicle and easy to load and unload. Another object is to provide a cargo carrier that can be mounted at the back end or back door of the van to minimize the wind resistance of the cargo carrier and to further facilitate access to the cargo carrier.

The present invention achieves these and other objects and benefits in the provision of a removable cargo carrier for use with van-type vehicles, in which the van includes a rear swing door assembly defining a groove between the door assembly and the van body. The removable cargo carrier includes a cargo box having a number of walls defining an enclosure with a door for providing access to the enclosure. A mounting frame is provided which includes a pair of spaced apart elongated vertical members with means at the bottom of the vertical members for abutting engagement with the bumper of the van. Means are provided for attaching the cargo box to the pair of vertical members. The invention further resides in the provision of upper connecting means proximal the top of the vertical members for connecting each of the vertical members to the door assembly at a portion of the groove between the vehicle body and the door assembly. The invention further provides means for reacting the weight of the cargo box and its contents against the vehicle door assembly at a fulcrum point which is generally mid-length along the length of the vertical members.

In another aspect of the invention, lower connecting means are provided near the bottom of the vertical members for connecting the mounting frame to the bottom of the door assembly at a portion of the groove.

In another embodiment of the invention, the cargo box includes a frame about which a fabric shroud is situated to define a cargo carrying enclosure. In still another embodiment, the cargo box is hingedly mounted at its lower back edge to the support frame to allow the cargo box to be pivoted between a vertical cargo carrying orientation and a general horizontal loading orientation.

Other aspects, objects and benefits of the present invention will become apparent through the following disclosure and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same.

It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
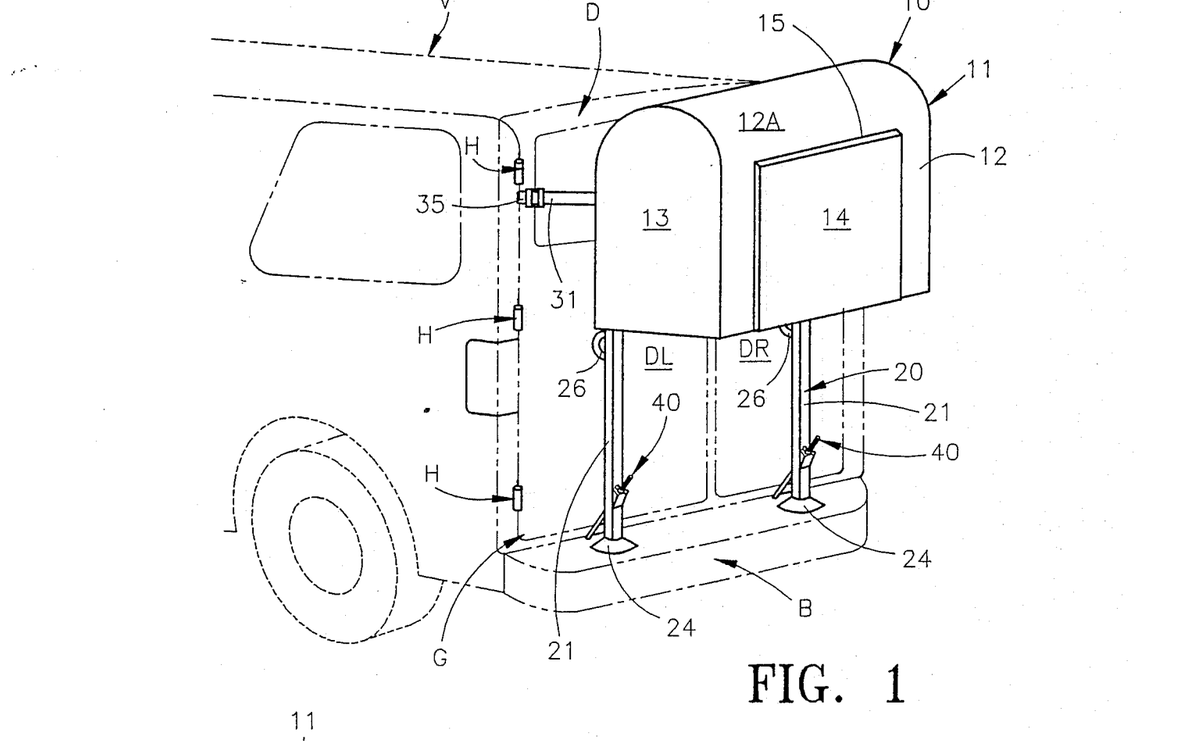
FIG. 1 is a perspective view of one embodiment of the cargo carrier of the present invention shown mounted on a mini-van.

In FIG. 1, a mini-van-type vehicle V includes a rear bumper B, and a rear swing door assembly D. The rear swing door assembly D includes a left door DL and a right door DR, each of which are hingedly mounted to the mini-van V at their outer edges by a number of hinges H. The door assembly D defines a groove G around the perimeter of the door assembly, which includes groove portions at the outer edges of the doors DL and DR and at the bottom edges of the rear swing doors adjacent the bumper B. Although the present invention is described in use with a mini-van vehicle, it may also be used with a larger full-sized van with the dimensions of the cargo carrier being increased appropriately.

A removable cargo carrier 10 of the present invention is mounted to the rear of the van V. The cargo carrier 10 includes a cargo box 11 defined by a curved panel 12 which is generally U-shaped to form a front wall 12A and a back wall 12B. The cargo box 11 is bounded by sidewalls 13 and a bottom wall, not shown in the figure, to form a complete enclosure. The cargo box 11 includes an access door 14 hingedly mounted by hinge 15 to the front wall 12A. A latch 16 (FIGS. 2 and 3) of conventional design may be provided to hold door 14 closed. The cargo box 11 is configured with the U-shaped panel 12 to provide a more streamlined contour for the top of the box in order to reduce the resistance or drag as air flows over the top of the moving van onto the top of the cargo box 11.

In the preferred embodiment, the cargo box 11 is composed of a thin gauge sheet metal, such as aluminum. However, the cargo box may also be composed of a vacuum-formed plastic or other suitable lightweight yet strong material. The cargo box material must be sufficiently strong to support the weight of luggage, camping gear, recreational equipment, or the like, that may be stored within the cargo carrier enclosure. The cargo box 11 may take on forms other than the shape shown in FIG. 1 in order to provide additional streamlining or drag reduction features. The cargo box 11 has an outer dimension of four feet wide, 2½ feet tall and 1¼ feet deep to be compatible with the Astro model minivan manufactured by Chevrolet Motor Corporation. However, these dimensions may be modified to accommodate other vans and mini-vans depending, for instance on the overall height and width of the door assembly and the placement of the vehicle license plate.

Figure 2:
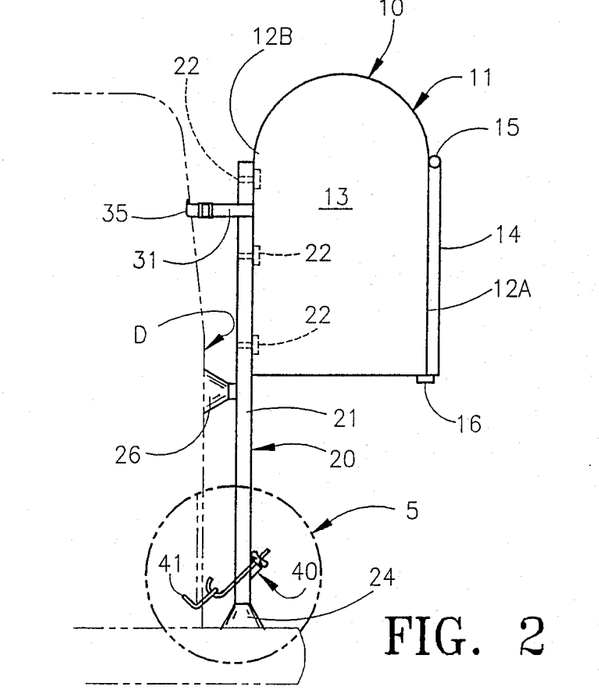
FIG. 2 is a side view of the cargo carrier of FIG. 1.
Figure 3:
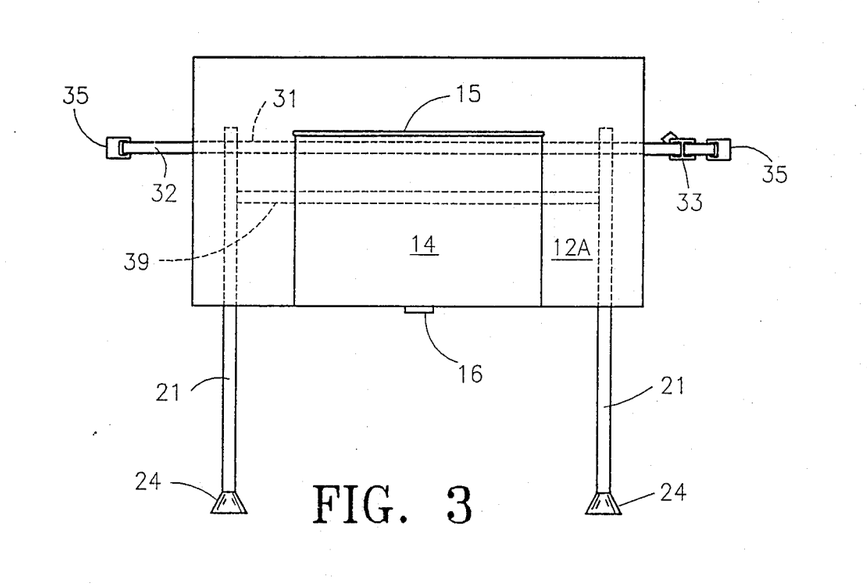
FIG. 3 is a front view of the cargo carrier of FIG. 1, shown apart from the van.

The removable cargo carrier 10 of the present embodiment includes a mounting frame 20. The cargo box 10 is attached to the mounting frame 20 by a number of screws 22 passing through the rear wall 12B of the cargo box and into a pair of vertical support members 21, as shown in FIG. 2. The vertical support members 21 are spaced apart roughly equivalently to the width of the cargo box 11 in order to provide adequate support to the cargo box. The vertical support members in the preferred embodiment are one inch square tubing members approximately 43 inches long to accommodate a typical mini-van. Preferably, the vertical support members 21 are composed of aluminum, although another material may be used provided it is capable of withstanding the bending and buckling loads exerted on the members by a supported fully-loaded cargo box 11.

The bottom of the vertical members 21 are supported by the vehicle bumper B. A cap 24 may be affixed to the bottom of the vertical member 21 to provide a gripping frictional surface for contact with the bumper B. In the preferred embodiment, the caps are composed of rubber and have a base diameter of about one and one-eight inch.

In an important aspect of the invention, a pair of suction cups 26 are attached generally mid-way up along the length of the vertical support members 21. The suction cups 26 are adapted for suction adherence to the outer wall of the door assembly D. As will be described herein, the suction cups 26 provide a fulcrum point for reacting the downward load and moment of a fully loaded cargo box 11.

The suction cups 26 can alternatively be a compressible pad or cushion, rather than the suction cups of the preferred embodiment. However, the use of the suction cups provides a more positive attachment to the door assembly which facilitates the later steps for mounting the cargo carrier onto the van.

Figure 1A:
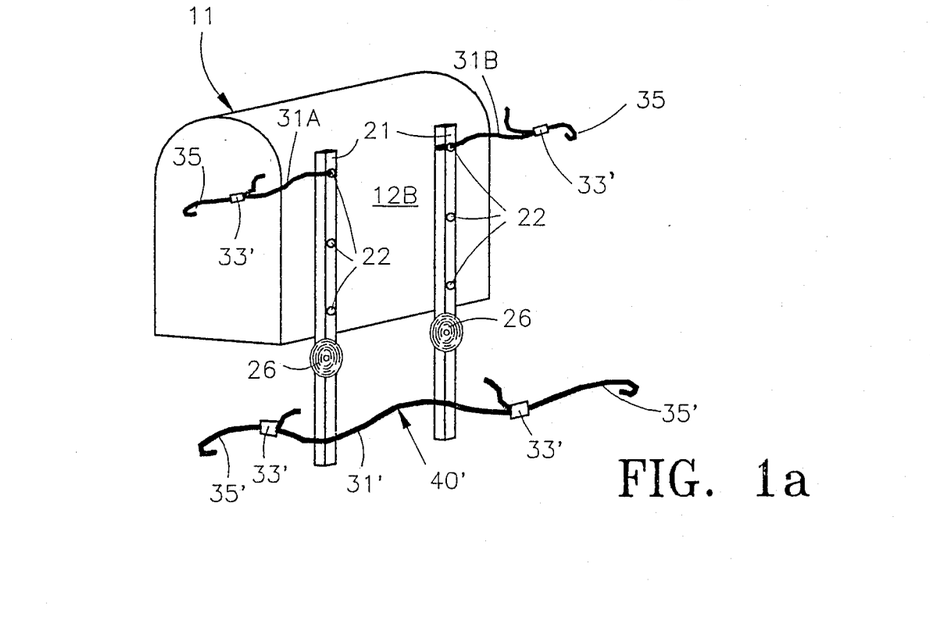
FIG. 1a is a rear perspective view of an alternative embodiment of the cargo carrier of the present invention shown apart from the mini-van.

The present embodiment of the invention further provides means for connecting the top portion of the vertical support members 21 to the van V. In the preferred embodiment, this upper connecting means, designated by apparatus 30, includes a flexible strap 31 that is restrained between the vertical support members 21 and the back wall 12B of the cargo box 11. As shown in FIG. 2, the flexible strap 31 is fed between the vertical members 21 and the back wall 12B at a location between the attachment bolts 22 used to attach the cargo box 11 to the vertical support members. However, the flexible strap 31 may be located at the van box attachment point with the bolts 22 threaded through the flexible strap in order to hold the flexible strap 31 in position. Alternatively, the flexible strap can be divided into a pair of separate straps 31a and 31b, each one attached to a vertical support member 21, as shown in FIG. 1a. In the preferred embodiment, the flexible strap 31 is a nylon multi-purpose lashing strap, such as is sold by the Cal Custom Company of Compton, California, as Item No. 10182.

Figure 4A:
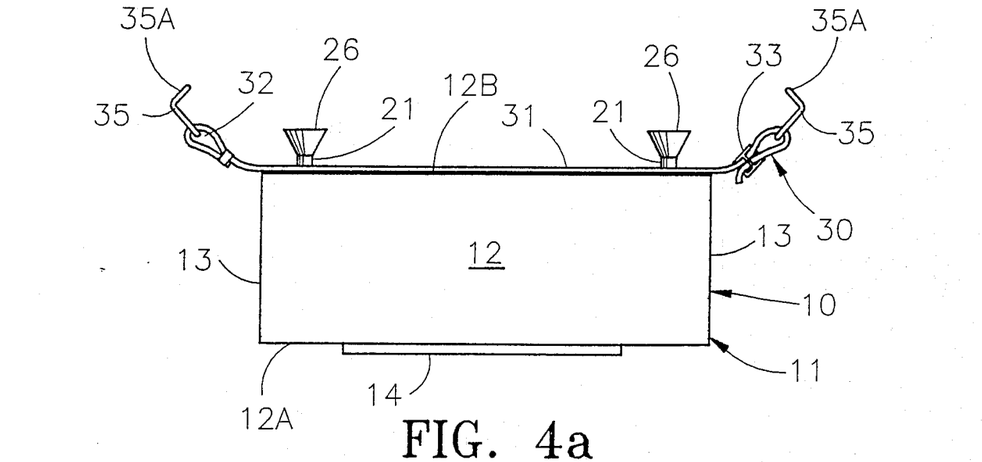
FIG. 4A is a top view of the cargo carrier of FIG. 1.
Figure 4B:
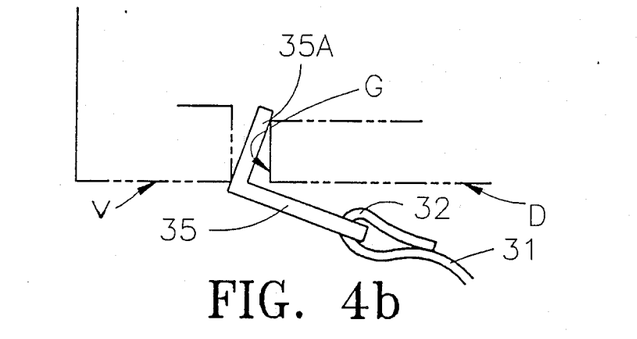
FIG. 4B is an enlarged detail view of the attachment bracket shown in FIG. 4A, with the bracket shown connected to the van body and door assembly.

The flexible strap 31 of the present embodiment includes a loop 32 at one of its free ends and a buckle assembly 33 at the other of its free ends. A connection bracket 35 is attached to the flexible strap 31 by the loop 32 and the buckle assembly 33. The buckle assembly is adjustable so that the total length of the flexible strap 31 can be adjusted to accommodate the particular dimensions of the door assembly D to which the removable cargo carrier 10 is being connected. Alternatively, a buckle assembly 33' can be arranged at the end of the two separate straps 31a and 31b shown in FIG. 1a. The connecting brackets 35 are engaged in the groove G between door assembly D and the van body V. As shown in the detailed view in FIG. 4B, the connecting bracket 35 includes a flange section 35A that is locked in the groove G between the van body V and the door assembly D. The tension applied by the flexible strap 31 keeps the connecting bracket 35 firmly engaged within the groove G in order to restrain the cargo carrier 10 against the van V.

Figure 4C:
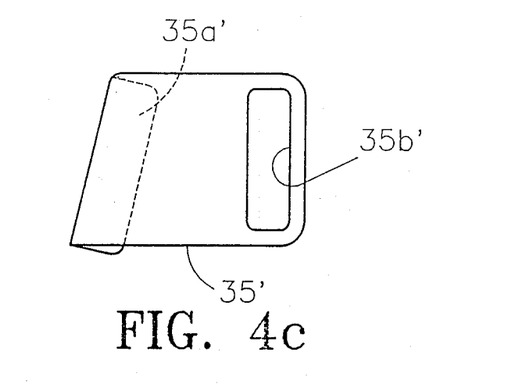
FIG. 4C is an enlarged side view of the bracket shown in FIG. 4B.

One configuration of the connecting bracket is shown in FIG. 4C. The bracket 35' includes an angled flange 35A' that corresponds to the angled contour of the groove G in many current mini-van designs in which the door assembly D tapers slightly inward toward the top of the door assembly. The angled flange portion 35A insures that the connecting bracket 35' will be situated in a generally horizontal orientation to insure that the bracket 35' will not work loose from the groove G. The connecting bracket 35' of this configuration also includes a loop opening 35B' through which the loop 32 of the flexible strap 31 is fed.

The removable cargo carrier 10 of the embodiment shown in FIG. 1 further includes a lower connecting means, designated generally as apparatus 40 in FIGS. 1 and 2. Several versions of the lower connecting means 40 are shown in FIGS. 5A-5F. In one version, the lower connecting apparatus 40 includes a bracket 41 that includes a lip 41A that is adapted to fit in the groove G at the bottom edge of the door assembly D. The bracket 41 includes a slot 41B adapted to engage a hook 42. The hook 42 includes a threaded end 42A. The hook 42 passes through an angled opening in the vertical support member 21 and through an angled bushing 43. A wing nut 44 is used to tighten against the bushing 43, thereby tensioning the hook 42 and the bracket 41. The lower connecting assembly 40 is oriented at a 55° angle in the preferred embodiment to optimize the engagement between the lip 41A of the bracket 41 and the groove G at the lower edge of the door assembly D to prevent the bracket 41 from disengaging. The angle and the shape of the bracket 41 may be modified to accommodate different door assembly configurations.

Figures 5A, 5B:
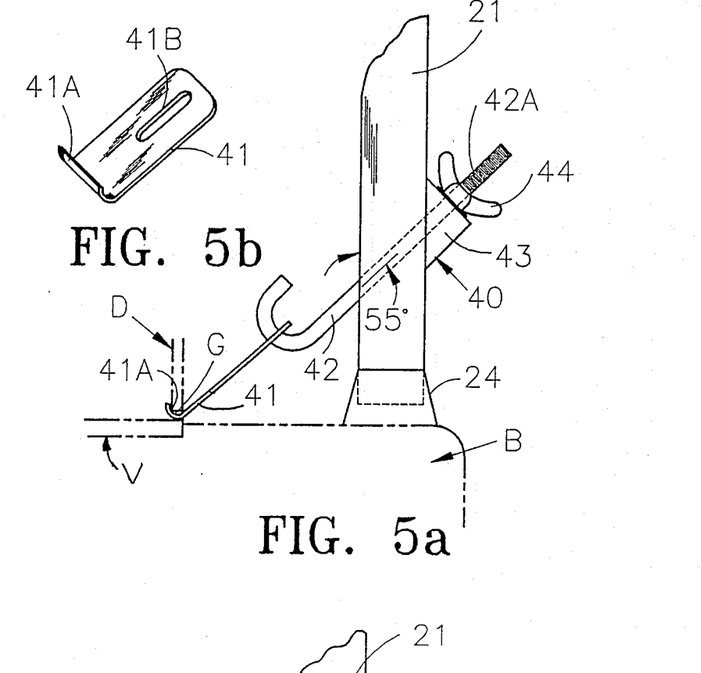
FIG. 5A is an enlarged side view of the lower connecting apparatus shown in FIG. 2 as depicted within Region 5 encircled on FIG. 2.
FIG. 5B is an enlarged perspective view of the connecting bracket shown in FIG. 5A.
Figure 5C:
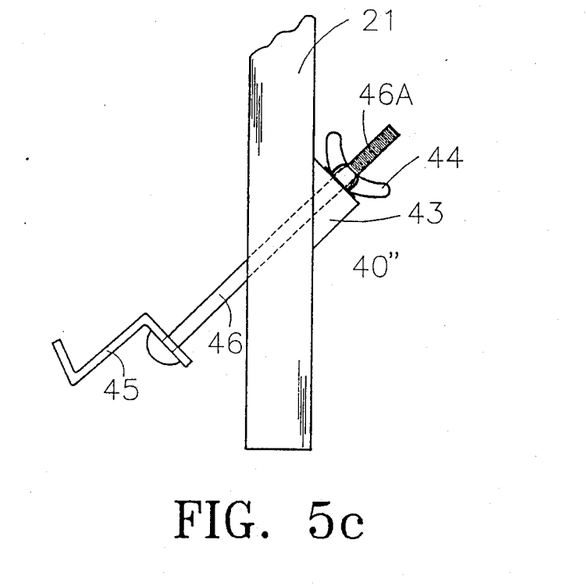
FIG. 5C is an alternative version of the lower connecting apparatus depicted in Region 5 of FIG. 2.

FIG. 5C shows an alternative version of the lower connecting assembly 40" in which a generally S-shaped bracket 45 includes an opening through which a bolt 46 is fed. The bolt 46 includes a threaded end 46A onto which a wing nut 44 is threaded to tighten against the angled bushing 43.

Figure 5D:
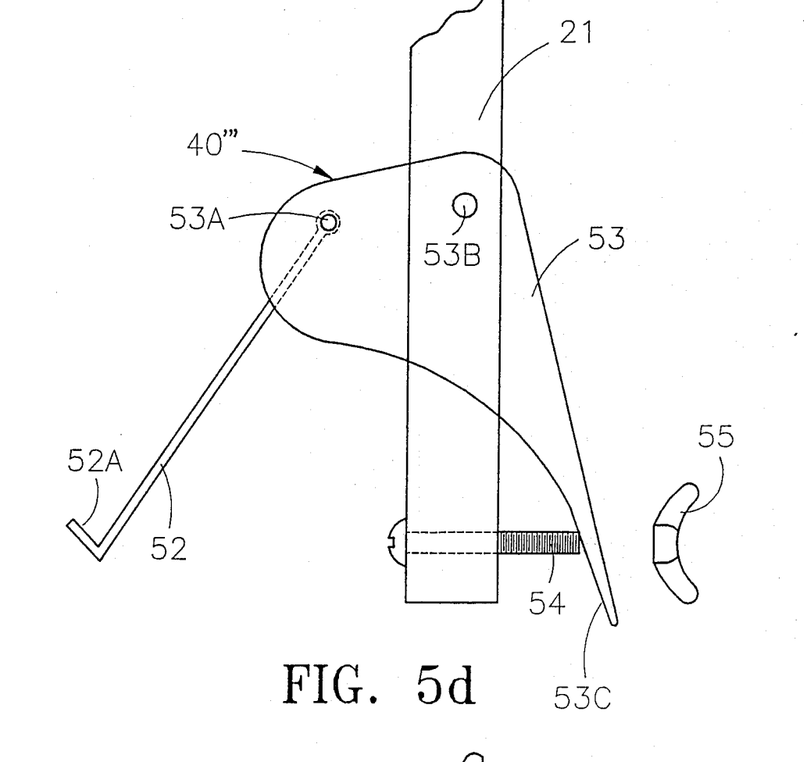
FIG. 5D is yet another alternative version of the lower connecting apparatus depicted in Region 5 of FIG. 2.

In FIG. 5D, a lock-over latch assembly is depicted for the lower connecting assembly 40'''. The assembly 40''' includes a bracket 52 having an angled retaining lip 52A adapted for engagement within the groove G. The bracket 52 is pivotably connected to a latch 53 at pivot 53A. The latch 53 is, itself, pivotably mounted to the vertical support member 21 at pivot 53B. The latch includes a locking arm 53C which has an opening for engagement with a bolt 54. The bolt 54 passes through the lower portion of the vertical support member 21 and is locked in place by a wing nut 55. The lock-over latch design of this version of the lower connecting apparatus 40''' provides simpler means to leverage the engagement of the bracket 52 with the groove G and the door assembly D. When the latch 53 is locked against the vertical support 21 by way of the bolt 54 and the wing nut 55, the bracket 52 will assume the 55° angle relative to the vertical support member 21 as shown in the previous versions.

Figure 5E:
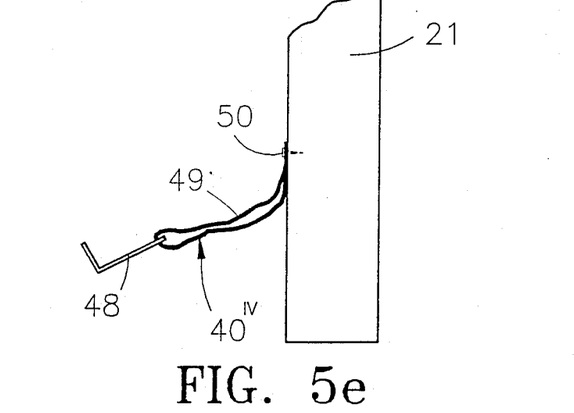
FIG. 5E is another alternative version of the lower connecting apparatus depicted in Region 5 of FIG. 2.
Figure 5F:
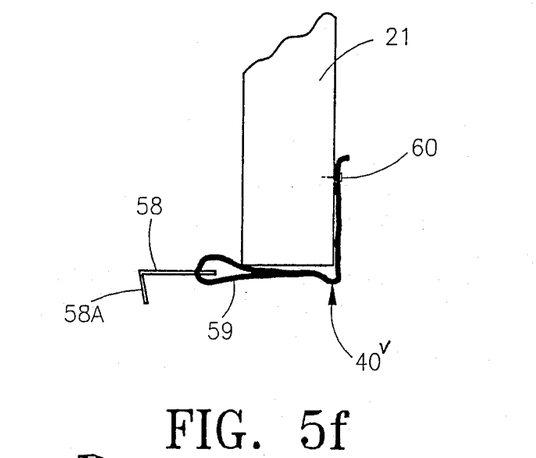
FIG. 5F is another alternative version of the lower connecting apparatus depicted in Region 5 of FIG. 2.

FIGS. 5E and 5F depict similar versions of the lower connecting apparatus, 40 IV and 40V respect using a flexible strap or loop. In FIG. 5E, a bracket 48, which has a shape similar to the bracket 42, is connected to a flexible strap 49 which is looped through an opening in the bracket 48. The free ends of the strap 49 are then attached to the vertical support member 21 by way of a machine screw 50. In a similar fashion, as shown in FIG. 5F, a bracket 58 is connected to a flexible strap loop 59 which is attached to the rear portion of the vertical support 21 by way of a machine screw 60. The bracket 58 includes a connecting lip 58A that is angled downward, rather than at the upward orientation of the retaining lips of the previous versions of the lower connecting apparatus. In this instance, the connecting lip 58A fits within the groove G and reacts against the van body V or the inside lip of the bumper B, rather than against the door assembly D as with the previous versions.

An alternative lower connecting means, designated as apparatus 40' in FIG. 1a, includes a flexible strap 31' that is similar to the strap 31 of the upper connecting apparatus and is similarly attached to the vertical members 21. The strap 31' includes at each of its ends a buckle assembly 33' to which a connection bracket 35' is attached, similar to the buckle assembly and bracket of the upper connecting apparatus. The brackets 35' engage the groove G at the sides of the door assembly D, rather than at the bottom of the door. This alternative arrangement is particularly well-suited for use with hatch-back type mini-vans in which the rear door opens upward.

The removable cargo carrier 10 of the present invention is easily mounted on the mini-van V. Since the cargo box 11 will be readily accessible when the cargo carrier 10 is mounted on the van V, there is no need to load the cargo box 11 prior to mounting the cargo carrier. Thus, the cargo carrier will be relatively lightweight and easy to maneuver into position on the van V. The first step in mounting the cargo carrier 10 is to place the vertical support members 21, and particularly the rubber caps 24, onto the van bumper B. At the same time, the retaining lip of the bracket 41 of the lower connecting assembly 40 is engaged beneath the door assembly D in the groove G. The bracket 41 can be thus engaged without the necessity of opening the doors of the door assembly D. With the lower retaining hooks 41 in position, the vertical support members 21 can be pushed toward the van body so that the suction cups 26 engage upon the door assembly D. With the suction cups 26 in place, the upper connecting apparatus 30 is connected to the groove G spanning the door assembly D. As with the lower connecting apparatus, the brackets 35 of the upper connecting apparatus are fed into the groove G and engaged against the door assembly D. The length of the flexible strap 31 can be adjusted to provide the proper amount of tension along the strap 31, and thereby the proper restraint of the brackets 35 within the groove G.

With the cargo carrier 10 loosely mounted on the van V, the lower connecting apparatus 40 can be tightened by tightening the wing nut 44 of the version shown in FIGS. 5A and 5C. Similarly, the lower connecting bracket 52 of the version shown in FIG. 5D can be tightened by pivoting the latch 53 and locking it in place using the bolt 54 and wing nut 55. With the support assembly firmly in position, the cargo box 11 can be loaded by raising the access door 14. Support brackets may be provided to hold the access door 14 open, although the brackets are not shown in the figures. The various features of the mounting frame 20 of the present invention provide for optimal load distribution of the laden cargo box 11, while permitting a lightweight and easy to mount cargo carrier 10. As thus described, the cargo carrier 10, and particularly the mounting frame 20, are capable of supporting a typical amount of luggage or other cargo while the van is traveling at normal highway speeds. While the upper and lower connecting apparatus 30 and 40 provide most of the lateral and fore-aft support, the rubber cups 24 provide vertical support against the bumper. The suction cups 26 act as a fulcrum point to react the force and moment of the exerted by the loaded cargo box. The suction cups also protect the van from scratching due to contact with the support frame 20.

Figure 6:
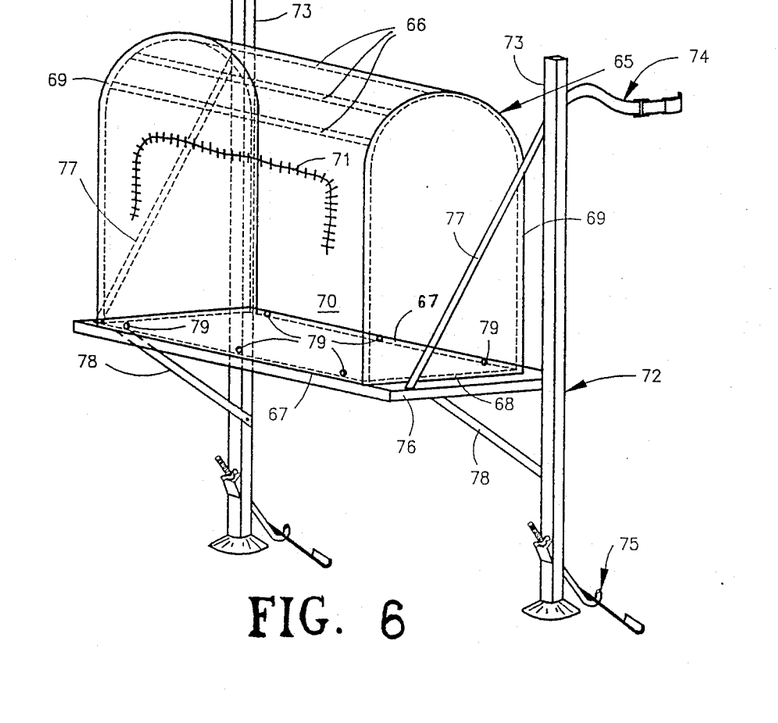
FIG. 6 is a perspective view of an alternative embodiment of the cargo carrier of the present invention.

In one alternative embodiment of the cargo carrier of the present invention, the cargo box 65, shown in FIG. 6, includes a metal frame. The metal frame is composed of a number of horizontal and vertical elements 66–69, as shown in FIG. 6. A one-piece fabric covering 70 is fitted over the frame members 66–69 to define a complete cargo enclosure. The fabric is preferably canvas, but may be another strong, lightweight material such as nylon or the like. A zippered opening 71 in the canvas covering 70 provides access to the enclosure. This fabric embodiment is lighter in weight than the embodiment previously described.

The cargo box 65 is supported by support assembly 72 which includes a pair of vertical members 73, each including an upper connecting apparatus 74, such as the strap and bracket arrangement previously described, for connecting the support assembly to the mini-van. Similarly, the assembly 72 includes a lower connecting apparatus 75 which may any of the configurations illustrated in FIGS. 5A–5F or FIG. 1A. The support assembly 72 includes a support platform 76 that is suitably attached to the vertical members 73, such as by rivets, screw, bolts or the like. The platform 76 is supported in its cantilevered orientation by an upper brace 77 and a lower brace 78, each of which are attached to the vertical members 73 in a conventional manner. The fabric cargo box 65 is attached to the platform 76 by a number of screws or similar fasteners 79.

Figure 7:
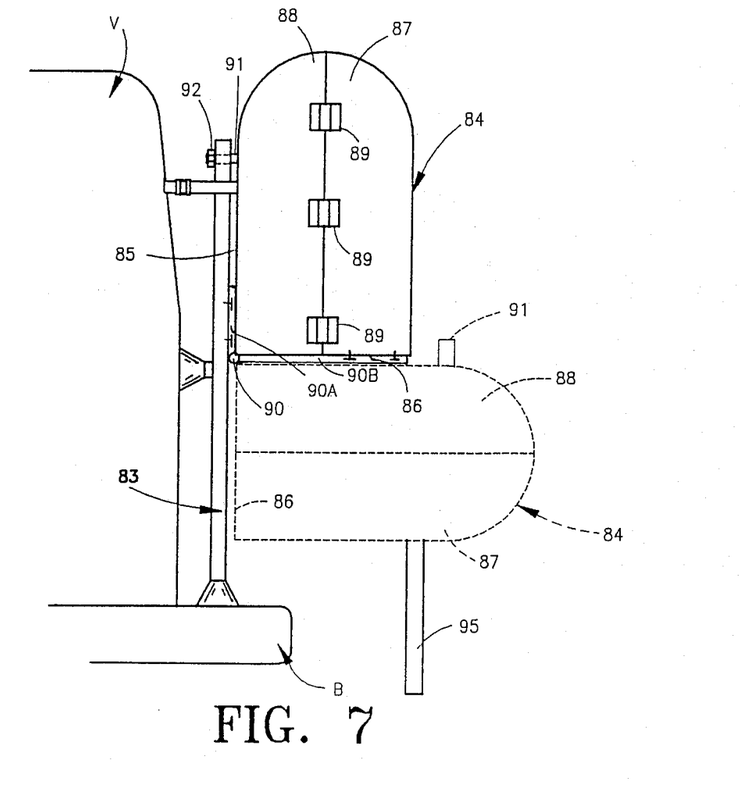
FIG. 7 is an alternative embodiment of the cargo carrier of the present invention with the van box hingedly mounted to the mounting frame, shown with the van box in its upright or vertical carrying position, and in its pivoted or horizontal loading position, as illustrated in dashed lines.

In another embodiment of the present invention, shown in FIG. 7, a mounting frame 83 is provided similar to the mounting frame 20 previously described. The mounting frame 83 rests against the bumper B and is connected to the van body B, groove G and door assembly D as previously described. The cargo box 84 is modified to include a lower container portion 87 and an upper container portion or lid 88. The lid 88 is hingedly connected to the lower container portion 87 by way of hinges 89 at the sides of the cargo box 84. The lid 88 is locked by way of latches 93 situated around the perimeter of the cargo box and spanning the joint between the lower container portion 87 and the lid 88.

The cargo box 84 itself is hingedly connected to the mounting frame 83 by way of a pair hinges 90 each having one arm 90a connected to the vertical support member of the mounting frame 83 and a second arm 90b attached to the bottom wall 86 of the lower container portion 87. A post or bolt 91 projects from the back wall 85 (which is the top of the lid 88) and is connected to the vertical members of the support frame by way of a nut 92. As shown in FIG. 7, the cargo box 84 is pivotable from an upright or vertical carrying position when locked against the mounting frame 83, to a horizontal loading position as depicted by the dashed lines. When so oriented, the bottom wall 86 of the cargo box abuts the vertical members of the mounting frame 83. A separate support post 95 may be provided to support the lower container portion 87 of the mounting box 84 while the cargo box is in its horizontal loading position.

Figure 8:
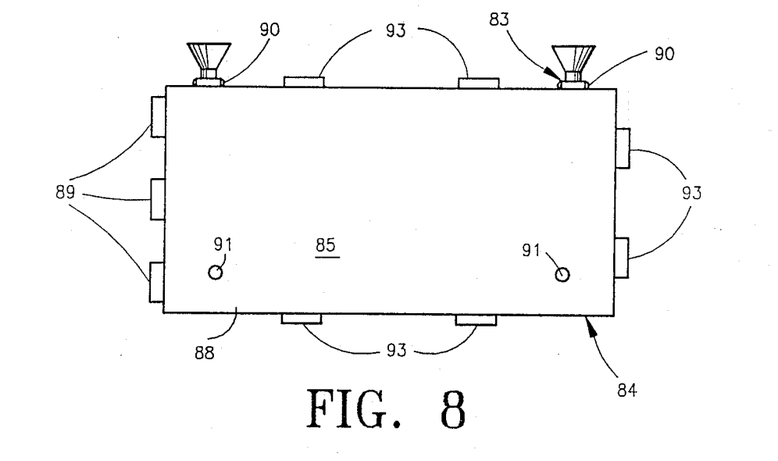
FIG. 8 is a top view of the cargo carrier of the embodiment shown in FIG. 7 AS viewed with the cargo box in its horizontal loading position.

In the horizontal loading position, as shown in the top view of FIG. 8, the latches 93 can be disengaged to allow the top 88 to be pivoted about the hinges 89. When the cargo box 84 is open, luggage and other cargo may be loaded into the lower container portion 87, and then the top 88 can be closed over the contents. When loaded, the cargo box 84 can then be pivoted about the hinge 90 until the post 91 engages within the vertical member of the mounting frame 83. The cargo carrier of this embodiment can be mounted on the van V in a manner similar to that described for the previous embodiments, with the exception that the cargo box 84 must be secured to the mounting frame 83 prior to mounting the cargo carrier onto the van.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For instance, although the cargo carrier has been described for use with vans having two outwardly opening rear swing doors, it may also be used with vans having a single, upwardly or sidewardly opening rear door, providing the van has a groove between the door assembly and the van body. In addition, the support frame can be configured to conform to different rear door assembly contours, such as door assemblies with forwardly angled portions.

What is claimed is:

1. A removable cargo carrier for use with van-type vehicles having a body, a bumper and a rear door assembly defining a groove between the body and the door assembly, comprising:
    a cargo box including a number of walls defining an enclosure for carrying cargo and a door for providing access to said enclosure; and
    a mounting frame including;
        a pair of spaced apart elongated vertical members with means at the bottom of said pair of vertical members for abutting engagement with the bumper of the vehicle;
        attachment means for attaching said cargo box to said pair of vertical members;
        upper connecting means, proximate the top of said pair of vertical members, for connecting each of said pair of vertical members to the door assembly in a portion of the groove between the vehicle body and the door assembly at the opposite sides of the door assembly; and
        means for supporting said cargo box and its contents against the vehicle door assembly at a fulcrum point generally mid-length along said pair of elongated vertical members.

2. The removable cargo carrier of claim 1, wherein said means for supporting includes a pair of suction cups, one each mounted to one each of said pair of vertical members, each of said pair of suction cups adapted for suction adherence to the door assembly.

3. The removable cargo carrier of claim 1, wherein said upper connecting means includes:
    strap means for providing adjustable connection to the door assembly connected to said pair of vertical members and having a pair of opposite free ends; and
    a pair of brackets, one each connected at one each of said free ends of said strap means, each of said pair of brackets including an engagement lip configured for engagement within the groove between the door assembly and the vehicle body.

4. The removable cargo carrier of claim 1, further comprising:
    lower connecting means proximate to the bottom of said pair of vertical members for connecting each of said pair of vertical members to a portion of the groove proximate to the bottom of the door assembly.

5. The removable cargo carrier of claim 4, wherein said lower connecting means includes:
a pair of second brackets, each one of said pair of second brackets including a second engagement lip configured for engagement within the groove between the door assembly and the vehicle body; and
adjustable tension means between each one of said pair of second brackets and a corresponding one of said pair of vertical members for tensioning each one of said pair of second brackets when each one of said second pair of brackets is engaged within the groove and when said pair of vertical members are in abutting engagement with the vehicle bumper.

6. The removable cargo carrier of claim 1, wherein:
said cargo box includes a bottom wall having an inboard edge facing the door assembly;
said attachment means includes;
hinge means for hingedly mounting said inboard edge of said cargo box to said pair of vertical members, whereby said cargo box is pivotable between a horizontal loading position and a vertical carrying position; and
locking means for locking said cargo box to said pair of vertical members in said vertical carrying position; and
said cargo carrier further includes means for maintaining said cargo box in said horizontal loading position.

7. The removable cargo carrier of claim 1, wherein said cargo box includes:
an interior frame; and
a cloth covering supported by said interior frame defining said walls of said cargo box and having a zippered opening for providing access to said enclosure.

8. The removable cargo carrier of claim 7, wherein said mounting frame further includes a cantilevered platform attached between and projecting generally perpendicularly from said pair of vertical members for supporting said cargo box thereon.

9. A removable cargo carrier for use with van-type vehicles having a body, a bumper and a rear door assembly defining a groove between the body and the door assembly, comprising:
a cargo box having a number of walls, including a back wall and a bottom wall, defining an enclosure for carrying cargo;
a mounting frame for supporting the cargo box, including:
vertical support means for supporting the frame on the bumper of the vehicle;
connecting means for connecting the frame to the vehicle door assembly having means for engaging portions of the groove between the door assembly and the vehicle body;
attachment means for attaching said cargo box to said mounting frame, including;
hinge means for hingedly attaching said back wall to said mounting frame whereby said cargo box is pivotable about said hinge means relative to said mounting frame from a vertical carrying position to a horizontal loading position; and
locking means for locking said cargo box to said mounting frame when said cargo box is in said vertical carrying position.

10. The cargo carrier of claim 9, wherein:
said cargo box includes means for accessing said enclosure only when said cargo box is pivoted to its horizontal loading position and for preventing access to said enclosure when said cargo box is in its vertical carrying position.

11. The cargo carrier of claim 9, wherein:
said cargo box is pivotable to said horizontal loading position with said bottom wall abutting said vertical support means; and
said cargo carrier further includes a separate ground engaging support post for supporting said cargo box in said horizontal loading position.

* * * * *